Sept. 7, 1965 R. E. BROCHETTI 3,204,294
INJECTION MOLDING MACHINE
Filed July 31, 1963 4 Sheets-Sheet 1
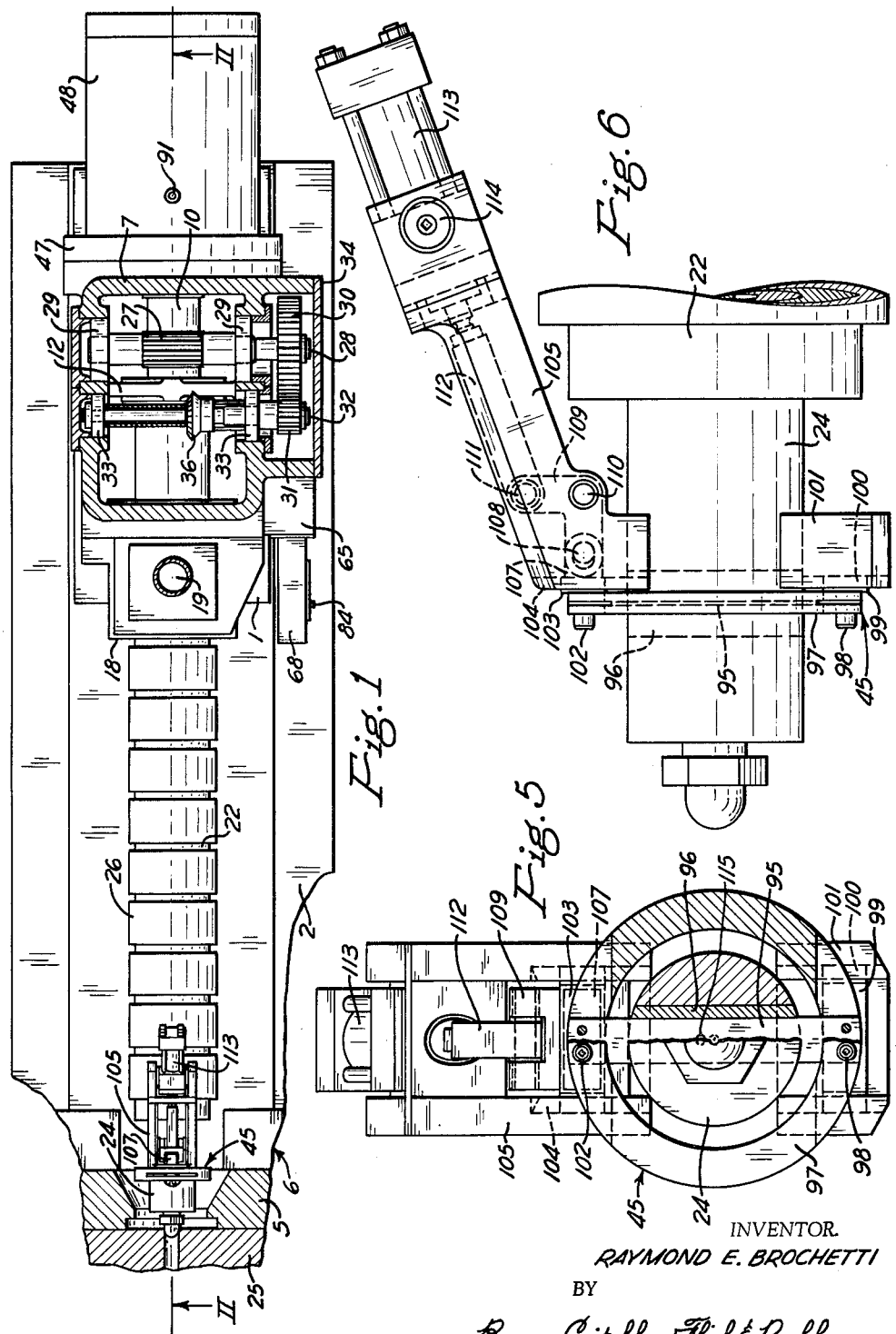
INVENTOR.
RAYMOND E. BROCHETTI
BY
Brown, Critchlow, Flick & Peckham.
ATTORNEYS.

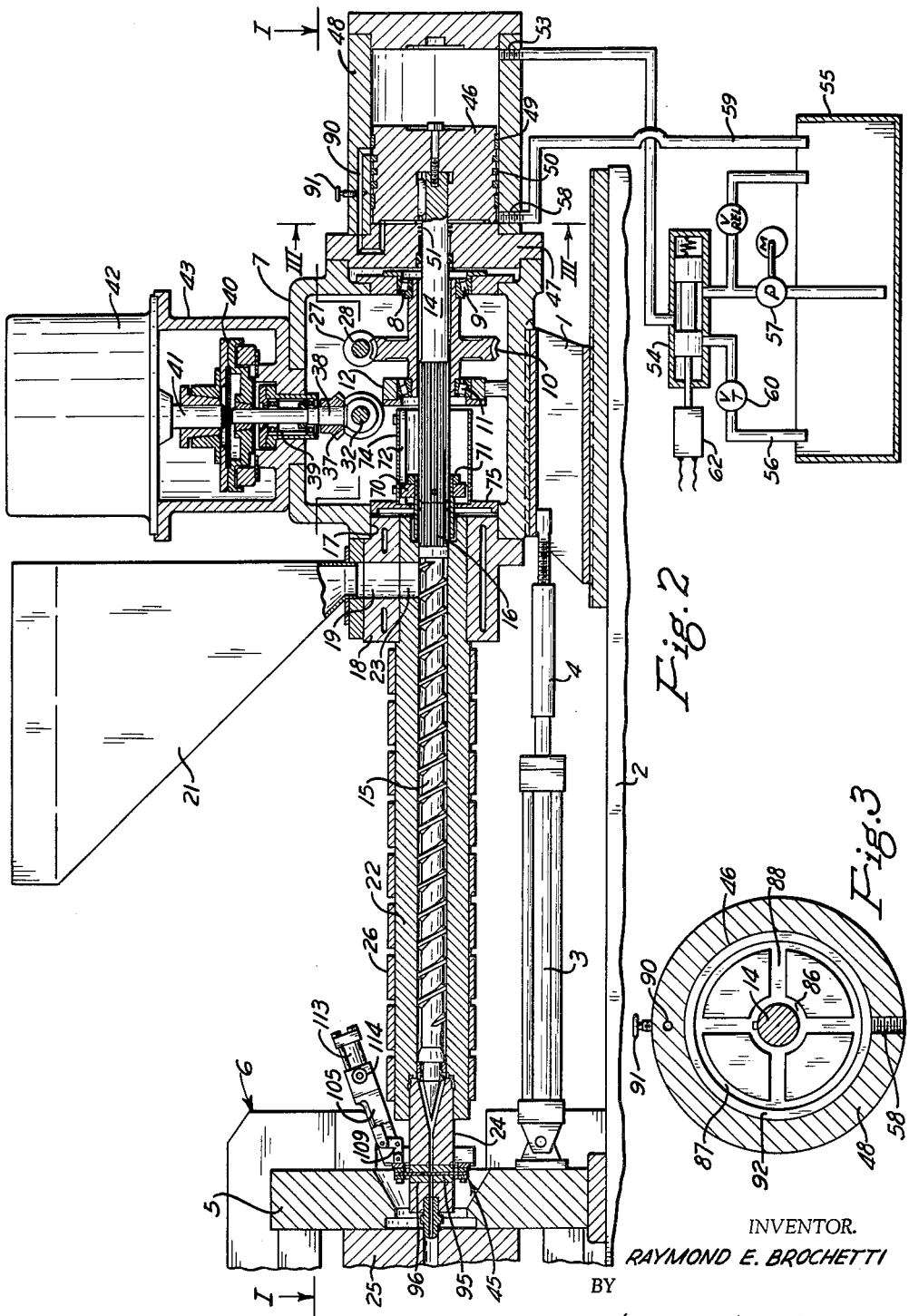

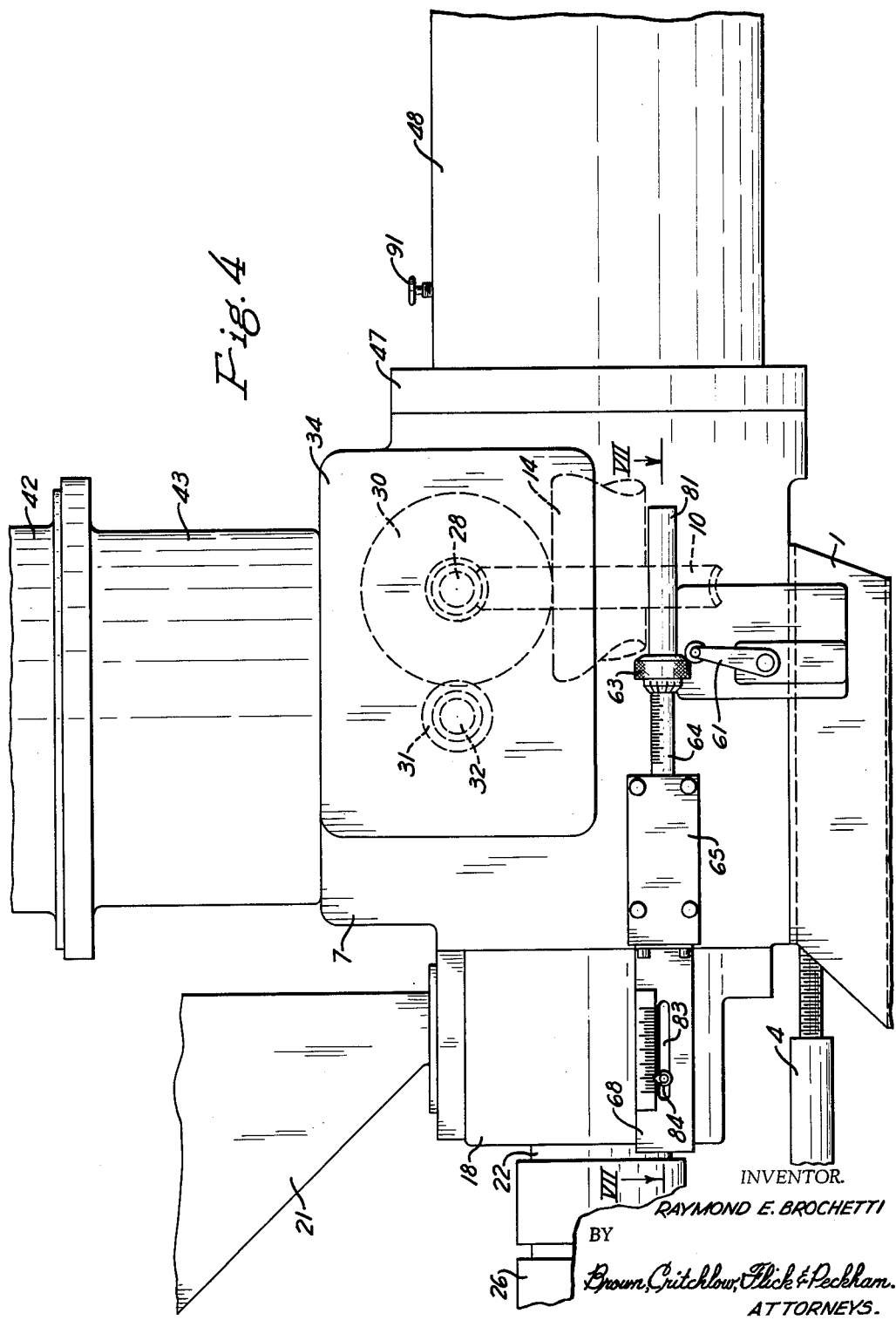

Sept. 7, 1965
R. E. BROCHETTI
3,204,294
INJECTION MOLDING MACHINE
Filed July 31, 1963
4 Sheets-Sheet 4
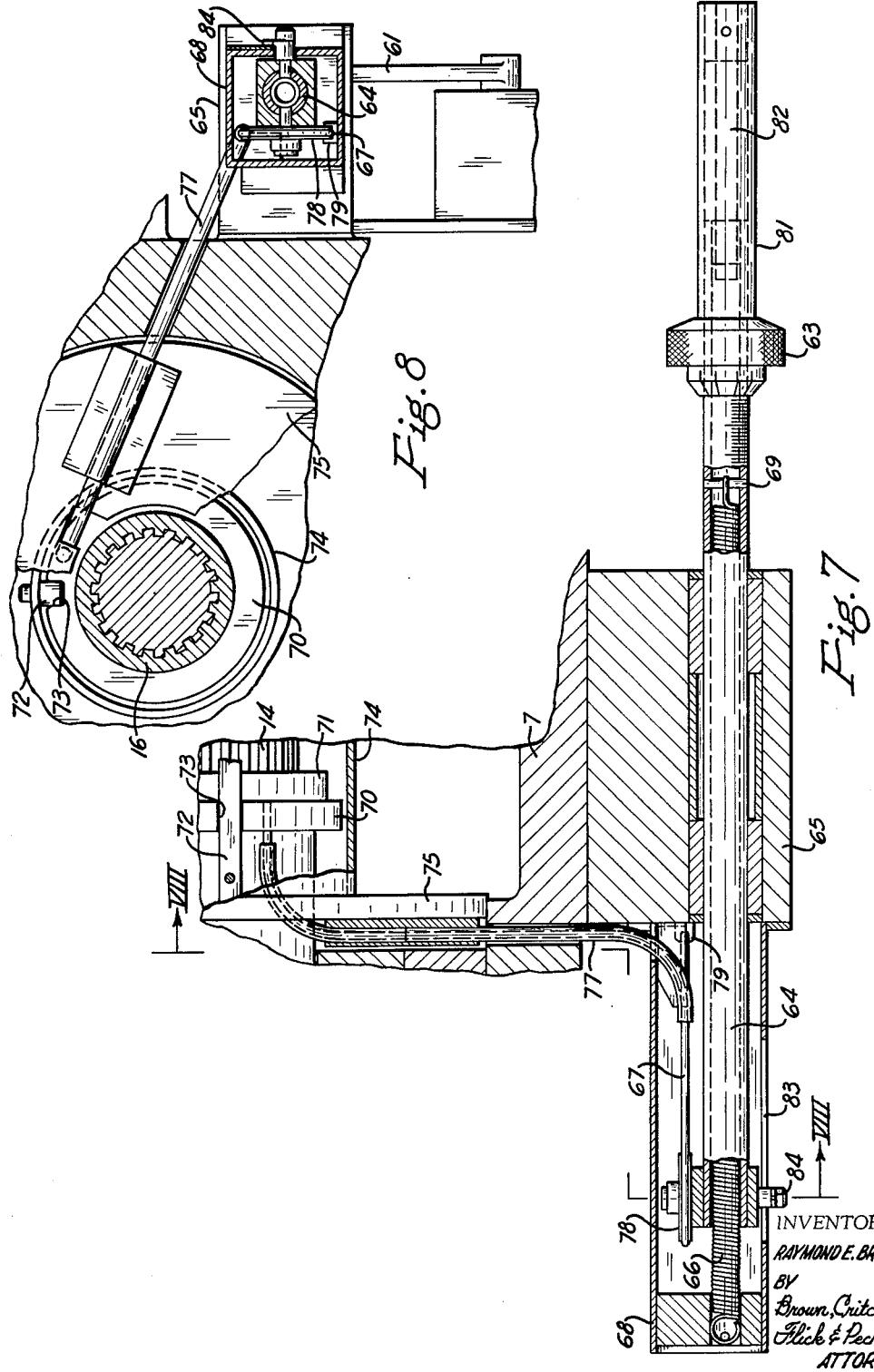
INVENTOR.
RAYMOND E. BROCHETTI
BY
Brown, Critchlow,
Flick & Peckham.
ATTORNEYS.

United States Patent Office 3,204,294
Patented Sept. 7, 1965

3,204,294
INJECTION MOLDING MACHINE
Raymond E. Brochetti, 85 Sherman Ave., Chicopee, Mass.
Filed July 31, 1963, Ser. No. 298,880
12 Claims. (Cl. 18—30)

This invention relates to machines for injecting plastic material into molds, and more particularly to the operation of the screw conveyor in such machines.

Injection molding machines handling plastic material are generally provided with screw conveyors for feeding the material into molds. Such a screw conveyor may be not only rotatably mounted but also movable axially. As the plastic material fed to the front end of the screw meets with resistance, the screw is pushed backward until at a predetermined time it is forced forward by a piston to inject a charge of material into a mold. In some cases rotation of the screw is stopped when it reaches its rear position, but in others it is advantageous to rotate the screw continuously. In such a case the piston at the rear end of the screw will rotate against the front end of the cylinder while the screw is in its front position. Since there may be great pressure against the back of the piston at that time, provision needs to be made for reducing friction between the front of the piston and the front of the cylinder. In the past, this has required thrust bearings, but they are expensive, they must be maintained and they require the machines to be enlarged to accommodate them. The same problem exists when the machine is operated as an extruder with hydraulic pressure maintained behind the piston to prevent the screw from retracting.

It is among the objects of this invention to provide an injection molding machine, in which the screw conveyor may rotate continuously, in which the use of a thrust bearing between the front end of the injection piston and the front wall of its cylinder can be avoided safely, and in which the moment at which fluid pressure is delivered to the back of the cylinder can be closely controlled.

The preferred embodiment of the invention is illustrated in the accompanying drawings, in which FIG. 1 is a plan view of my machine, partly in section as viewed on the line I—I of FIG. 2;

FIG. 2 is a vertical longitudinal section taken on the line II—II of FIG. 1;

FIG. 3 is an enlarged cross section taken on the line III—III of FIG. 2;

FIG. 4 is an enlarged fragmentary side view of the rear portion of the machine;

FIG. 5 is an enlarged view of the front end of the machine, with parts broken away in section;

FIG. 6 is an enlarged fragmentary side view of the front end of the machine;

FIG. 7 is an enlarged fragmentary horizontal section taken on the line VII—VII of FIG. 4 and sloping up into the machine; and FIG. 8 is a fragmentary vertical cross section taken on the line VIII—VIII of FIG. 7.

Referring to FIGS. 1 and 2 of the drawings, the base 1 of the machine is slidably mounted on one end of the machine bed 2, along which it can be moved by a hydraulic cylinder 3 having a piston rod 4 extending out of its rear end and rigidly connected to the base. The front end of the cylinder is secured to the front end plate 5 of the frame of a mold lock-up mechanism 6. Mounted on the machine base is a gear housing 7, in the back wall of which there is an opening 8 containing a bearing 9 that supports the rear end of the long hub of a worm gear 10. The front end of the hub is mounted in a bearing 11 in an opening through a vertical partition 12 in the housing. Splined in the front end of the hub of this gear and projecting from its opposite ends in a shaft 14 that is an extension of the rear end of a conveyor screw 15. The front end of the extension shaft and the rear end of the screw are connected together by a splined coupling sleeve 16 that extends through an opening 17 in the front wall of the gear housing. Mounted in this opening is the rear end of a water cooled hopper housing 18. This housing has a passage through it from front to back and an inlet port 19 at the top. Disposed in the inlet port is the outlet of a hopper 21 that is mounted on the hopper housing. The later supports the rear end of a long barrel 22, in which the conveyor screw is rotatably and slidably mounted. The top of the barrel inside the hopper housing is provided with an inlet port 23 connecting the hopper port 19 with the inside of the barrel. Mounted in the front end of the barrel is an injection nozzle 24 that extends through a central hole in the front end plate 5 of the lock-up frame for injecting plastic material into a mold 25. The barrel is encircled by electric heating bands 26.

The worm gear 10 in the gear housing is driven from above by a pinion 27 on a horizontal shaft 28 extending across the back part of the housing and having its ends mounted in bearings 29 supported in the side walls of the housing. The shaft projects outwardly from one of the bearings and supports a gear 30 that is driven by a pinion 31 on the projecting end of a parallel shaft 32, which is mounted in bearings 33 supported in the housing. Gear 30 and pinion 31 are disposed in a gear box 34 integral with the side of the gear housing. The central portion of shaft 32 carries a bevel gear 36 that is driven by a similar gear 37 mounted on the lower end of a vertical drive shaft 38 that is mounted in bearings 39 in the top of the housing. The upper end of the drive shaft is connected by a coupling or electric clutch 40 with the lower end of the shaft 41 of a vertical electric motor 42 that is supported by a housing 43 surrounding the coupling 40. Other types of drives for the conveyor screw, such as a hydraulic drive, could be used if desired.

As is well-known, while the conveyor screw rotates, it feeds plastic pellets forward from the hopper to the barrel nozzle. By providing the nozzle with a valve 45 that is closed at the time, the plastic material will be compacted between the valve and rotating screw and the resulting backward pressure against the screw will push it backward in the barrel until the valve is opened and the screw is pushed ahead to inject a charge of plastic into the mold in the lock-up mechanism. Then the valve is closed again. The forward or injection stroke of the screw is produced by a piston 46 (FIG. 2) rigidly mounted on the rear end of shaft 14 projecting from the back of the gear housing and through the front wall 47 of a hydraulic cylinder 48 bolted to the back of the housing. The periphery of the piston is spaced slightly from the side wall of the cylinder by loosely fitting runner rings 49, between which there are piston rings 50 that prevent fluid from passing the piston. Seals 51 are also used around the shaft in the front wall of the cylinder.

While the conveyor screw is at the front end of its stroke, the piston is at the front end of the cylinder in engagement with its front wall, but as the screw is forced backward by the plastic material building up in front of it, the screw pushes the piston toward the rear end of the cylinder. As soon as the screw is moved back far enough to produce the desired volume of plastic in front of the screw, valve 45 is opened and the piston is forced ahead to drive the screw forward in the barrel like a ram to eject the plastic from the nozzle. This driving is accomplished by providing the back part of the cylinder with a combination inlet and outlet port 53 that is connected through a three way valve 54 of any suitable construction to a tank 55 by means of drain pipe 56 and a pump 57. The front part of the cylinder likewise is provided with an outlet port 58 that communicates with the periphery of the piston around its front end when the piston is in its forward position. This port is connected through a pipe 59 with the tank. A throttle valve 60 in drain pipe 56 may be used to control the rate of flow from the back of the cylinder to the tank, and thereby control the extent of the pressure that will be applied to the plastic material in front of the screw as the screw is forced backward.

To determine when the pressure fluid will be admitted to the back of the cylinder through port 53, an actuating member or "flag" outside of the gear housing is moved lengthwise of the screw to trip valve 54, such as by closing an electric switch 61 (FIG. 4) that operates a solenoid 62 (FIG. 2) to cause the valve to connect the pump with the cylinder. As shown in FIGS. 4, 7 and 8, the flag 63 is mounted on supporting means, preferably a tube 64, slidably mounted in a bearing 65 projecting from the side of the gear housing below the gear box. The tube is urged forward by a spring 66, but is moved backward with the screw by means of a flexible cable 67 movable by the screw. The front end of the spring is anchored in the front end of a casing 68 extending forward around the tube from bearing 65. The spring extends back into the tube and has its rear end connected to a cross pin 69.

The inner end of the cable is rigidly connected to a collar 70 in any suitable manner. The collar is mounted on the rear end portion of the coupling sleeve 16 in the front part of the gear housing, where the collar is held loosely by a nut 71 screwed onto the sleeve. The collar is prevented from rotating with the coupling sleeve by means of a key 72 projecting into a notch 73 in the collar and extending lengthwise of the inside of a cylindrical housing 74, to which it is fastened. The front end of the housing is rigidly supported by a ring 75 mounted in opening 17. From the collar the cable extends lengthwise of the screw, preferably forward a short distance, and then laterally away from it and again lengthwise of the screw for connection with the supporting tube for the flag. The path of the cable may be controlled by a guide tube 77 that has a short inner end portion that curves around into a body portion extending outward away from the screw and curving into an outer end portion extending lengthwise of the screw. By extending the outer end of the guide tube forward, the cable can be directed around a sheave 78 pivotally mounted on the front end of the flag-supporting tube 64 and then led back to a point 79 near the outer end of the guide tube, where the cable is anchored to the machine. If desired, a curved guide tube can be substituted for the sheave. When the cable is wrapped around the sheave, it will be seen that for every inch of movement of the conveyor screw backward the supporting tube 64 will be moved only one-half inch.

The flag 63 preferably is a ring rigidly mounted on the front end of a sleeve 81 that telescopes over the rear end of tube 64 and that is provided internally with a forwardly extending threaded stud 82 screwed into the rear end of the tube. By rotating the flag or sleeve, they can be moved forward or backward on the tube to control the point at which hydraulic pressure will be admitted to the cylinder. The distance that the conveyor screw moves backward can be observed by providing casing 68 with a longitudinal slot 83 through which a pointer 84 on the front end of tube 64 projects.

Since the conveyor screw continues to rotate and inject after piston 46 reaches the front end of the cylinder as long as valve 45 is open, the great hydraulic pressure against the back of the piston requires that something be done at the front of the piston to allow for that pressure. The logical solution would be a thrust bearing, but a bearing of adequate capacity would have to be extremely large and that would increase the size of the machine appreciably. Also, such a bearing would be expensive to build and to mount. A feature of this invention is that the function of a thrust bearing can be obtained without using one, by employing a hydraulic balance. This is accomplished in part by providing one of the opposing faces at the front of the piston, preferably the front face of the piston itself, with a circular recess concentric with the piston. The recess may be an annular groove 86 as shown in FIG. 3, but in such a case best results are obtained if the same face of the piston also is provided with a larger annular groove 87 near its periphery and with radial grooves 88 connecting the two annular grooves.

Opening into the outer groove is the outlet of a passage 90 that extends through the front wall 47 and adjoining side wall of the cylinder 48 back to the inside of the cylinder to a position that is directly behind the rear piston ring when the piston is against the front wall of the cylinder as shown in FIG. 2. As soon as the piston starts to move backward in the cylinder the rear piston ring will cut off communication between the cylinder and the inlet of the passage. Conversely, just before the forwardly moving piston reaches the front wall of the cylinder, the inlet of passage 90 will be uncovered and the high pressure injection oil behind the piston will be delivered through the passage to the grooves in the front face of the piston. The rate at which oil flows through the passage can be controlled by a throttle valve 91 or a fixed orifice. All of the area of the piston face inside the narrow circular band 92 that encircles outer groove 86 is at the same high injection pressure, while the pressure across the circular band decreases outwardly from the high injection pressure to low tank pressure because the oil escaping from between the front of the piston and the front wall of the cylinder drains back to the tank through outlet port 58 and pipe 59. All of the hydraulic pressure between the front of the piston and the cylinder tends to balance the pressure behind the piston and therefore relieves the pressure of the piston against the front wall of the cylinder. The remaining unbalanced forward thrust is carried easily by band area 92 and the flat areas of the piston face between the grooves. All of those areas together serve as a thrust bearing of considerable size.

As shown in FIGS. 1, 2, 5 and 6, the valve 45 at the nozzle includes a sliding valve member in the form of a narrow strip 95 of steel that is only about 1/32 inch thick so that it will not expand enough from the heat of the nozzle to bind in the slot in which it is slidingly mounted. The slot may extend along the flat inner face of one of a pair of semi-cylindrical members that together form a cylindrical core 96 which fits tightly in a radial bore through the nozzle, or the valve strip may be made nearly as wide as the bore and space the two parts of core 96 apart. The opposite ends of the valve strip project above and below the nozzle and are mounted in a ring 97 that encircles the nozzle in spaced relation with it. The screws 98 that extend through the bottom of the ring and the lower end of the valve strip fasten them to a dove-tail block 99 that can slide vertically in a dove-tail slot 100 in a block 101 attached to the bottom of the nozzle. The screws 102 at the top of the ring fasten it to a similar block 103 slidable in vertical groove 104 in the opposite sides of the front end of a bifurcated frame 105 inclined upward and backward. The front end of the frame is welded to the nozzle.

Projecting from the back of the top block is a lug 107, through which a horizontal pin 108 extends. The ends of the pin extend into horizontally elongated openings in the forked front end of a crank 109 that is pivotally mounted in the frame on a pin 110. The upper end of the crank is connected by a pivot pin 111 to the front end of a piston rod 112 that extends back into a cylinder 113, the front end of which is provided with trunnions 114 pivotally mounted in the opposite sides of the rear end of the frame. When the piston rod is moved forward, the bell crank is turned to lower the rings and valve strip and thereby cause a hole 115 in the strip to register with the passage through the nozzle to open the valve. Cylinder 113 may be controlled by a solenoid valve (not shown) that is energized by the closing of switch 61 to admit fluid pressure to the back of the cylinder. The switch may also start a timer that controls the injection period and the time that valve 95 remains open.

If desired, ring 97 and parts 98 to 101 may be eliminated and the upper end of valve strip 95 may be attached by screws 102 directly to upper block 103. This is possible with a valve strip approximately 1/32 inch thick because it will flex easily and yet be stiff enough to be pushed down by block 103. In fact, in some cases block 103 also could be eliminated and the upper end of the valve strip connected directly with the front end of crank 109.

According to the provisions of the patent statutes, I have explained the principle of my invention and have described what I now consider, to represent its best embodiment. However, I desire to have it understood that, within the scope of the appended claims, the invention may be practiced otherwise than as specifically described.

I claim:

1. In an injection molding machine having a rotatable and axially movable conveyor screw, a piston rigidly connected with the rear end of said screw, a stationary cylinder containing the piston and having a front end wall provided with a fluid passage having an outlet inside the cylinder in front of the piston and also having an inlet, means operative after the rotating screw has moved the piston toward the back of the cylinder to deliver fluid under pressure to the cylinder behind the rotating piston for driving it forward against the front end wall of the cylinder, means for diverting some of said pressure fluid from behind the rotating piston to said passage inlet as the forwardly moving piston reaches the front end of the cylinder, the cylinder being provided at its front end with an outlet port communicating with the periphery of the piston around the front end thereof, whereby said diverted pressure fluid in front of the rotating piston will greatly reduce the pressure of the piston against the front end wall of the cylinder so that a thrust bearing between them is unnecessary.

2. In an injection molding machine according to claim 1, the inlet of said diverting means being located where it will be beside the piston while the piston is against the front wall of the cylinder, and a piston ring encircling the piston at the front edge of said inlet and movable by the piston back across the inlet to shut off communication of said inlet with the cylinder behind the piston.

3. In an injection molding machine according to claim 1, said front end wall of the cylinder and the front end of the piston having opposed faces, and one of said faces being provided with a circular recess concentric therewith, said passage outlet communicating with said recess.

4. In an injection molding machine according to claim 3, said recess being an annular groove, and said one face being provided concentrically with another annular groove and with radial grooves connecting the two annular grooves, whereby to provide bearing surfaces surrounded by said grooves.

5. In an injection molding machine according to claim 1, including a barrel for the conveyor screw having at its front end a nozzle provided with a transverse opening therethrough intersecting its passage, a pair of core members rigidly mounted in said opening, a thin straight valve strip slidably mounted between said core members in engagement therewith and projecting endwise therefrom, and means operatively connected to an end of the valve strip for moving the strip lengthwise from one position to another, said strip being provided with an opening adapted to register with the nozzle passage when the strip is in one of said positions.

6. In an injection molding machine according to claim 1, including a barrel for the conveyor screw having at its front end a nozzle provided with a transverse slot therethrough intersecting its passage, a thin straight valve strip slidably mounted in said slot and projecting endwise therefrom, a ring encircling the nozzle and spaced therefrom, means securing the ends of said valve strip to the ring, and means for moving said ring radially to move the valve strip lengthwise in said slot from one position to another, said strip being provided with an opening adapted to register with the nozzle passage when the strip is in one of said positions.

7. In an injection molding machine according to claim 1, including a barrel for the conveyor screw having at its front end a nozzle provided with a transverse slot therethrough intersecting its passage, a thin straight valve strip slidably mounted in said slot and projecting endwise therefrom, a ring encircling the nozzle and spaced therefrom, means securing the ends of said valve strip to the ring, a crank pivotally mounted on the nozzle at one side of the ring, means connected to one end of the crank for rocking it and extending along the barrel away from the nozzle, and means operatively connecting the opposite end of the crank with said ring for moving the ring radially when the crank is rocked, whereby the valve strip will be moved lengthwise in said slot from one position to another, said strip being provided with an opening adapted to register with the nozzle passage when the strip is in one of said positions.

8. In an injection molding machine according to claim 1, including a barrel for the conveyor screw having at its front end a nozzle provided with a transverse slot therethrough intersecting its passage, a thin straight valve strip slidably mounted in said slot and projecting endwise therefrom, a crank pivotally mounted on the nozzle at one end of said slot, means connected to one end of the crank for rocking it and extending along the barrel away from the nozzle, and means operatively connecting the opposite end of the crank with the adjacent end of the valve strip for moving the strip lengthwise in said slot from one position to another when said crank is rocked, said strip being provided with an opening adapted to register with the nozzle passage when the strip is in one of said positions.

9. In an injection molding machine according to claim 1, an actuating member movable lengthwise of the screw to a predetermined operating position for periodically actuating said fluid-delivering means, supporting means for said member movable lengthwise of the screw, a collar in front of the cylinder rotatably mounted on a rearward extension of said screw and movable axially with the extension, a flexible cable having an inner end rigidly connected to the collar, means directing the cable from said collar lengthwise of the screw and then laterally away from it and again lengthwise of the screw, means connecting the outer portion of the cable with said actuating member supporting means, and a spring urging said supporting means in a direction to maintain said outer portion of the cable taut, whereby axial movement of the conveyor screw backward will pull said cable and thereby move said supporting means against the resistance of the spring to move said actuating member into operating position so that said pressure fluid will be delivered to the cylinder.

10. In an injection molding machine according to claim 9, said cable-directing means being a rigidly mounted tube in which the cable slides, the tube having end portions extending lengthwise of the screw connected by a laterally extending central portion.

11. In an injection molding machine according to claim 9, said supporting means being a tube, and said actuating member having a threaded connection with one end of the tube for adjustment along it.

12. In an injection molding machine according to claim 9, including a sheave mounted on said supporting means, the outer portion of said cable being looped around the sheave, and means anchoring the outer end of the cable in fixed position, said spring maintaining the cable loop taut.

References Cited by the Examiner

UNITED STATES PATENTS

| | | | |
|---|---|---|---|
| 966,601 | 8/10 | Rosenfelt et al. | 91—399 X |
| 2,293,334 | 8/42 | Ernst | 91—399 X |
| 2,734,226 | 2/56 | Willert | 18—12 |
| 2,988,779 | 6/61 | Barton et al. | 18—30 |
| 3,032,819 | 5/62 | Gasmire | 18—12 |
| 3,133,316 | 5/64 | Arpajian | 18—30 |

J. SPENCER OVERHOLSER, *Primary Examiner.*

MICHAEL V. BRINDISI, *Examiner.*